United States Patent
Kumar (10) Patent No.: US 8,504,272 B2
(45) Date of Patent: *Aug. 6, 2013

(54) SYSTEM AND METHOD FOR VERIFYING THE AVAILABILITY OF A LEVEL OF A BRAKING SYSTEM IN A POWERED SYSTEM

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/307,314

(22) Filed: Nov. 30, 2011

(65) Prior Publication Data

US 2012/0078454 A1    Mar. 29, 2012

Related U.S. Application Data

(63) Continuation of application No. 12/189,980, filed on Aug. 12, 2008, now Pat. No. 8,078,376.

(60) Provisional application No. 61/048,275, filed on Apr. 28, 2008.

(51) Int. Cl.
*B60T 17/22* (2006.01)
*G06F 19/00* (2011.01)

(52) U.S. Cl.
USPC .............. 701/70; 701/19; 701/32.3; 303/122

(58) Field of Classification Search
None
See application file for complete search history.

(56) References Cited

U.S. PATENT DOCUMENTS

| 4,203,058 | A | * | 5/1980 | Chen | 318/380 |
|---|---|---|---|---|---|
| 4,440,015 | A | * | 4/1984 | Hann | 73/39 |
| 4,830,437 | A | * | 5/1989 | Rumsey | 303/18 |
| 5,041,772 | A | * | 8/1991 | Earleson et al. | 318/375 |
| 5,517,093 | A | * | 5/1996 | Augustyniak et al. | 318/63 |
| 5,586,812 | A | * | 12/1996 | Kanjo et al. | 303/7 |
| 5,681,992 | A | * | 10/1997 | Klein et al. | 73/121 |
| 5,892,437 | A | * | 4/1999 | Scheibe et al. | 340/467 |
| 5,898,102 | A | * | 4/1999 | Skantar | 73/39 |
| 6,035,250 | A | * | 3/2000 | Newton et al. | 701/70 |
| 6,435,624 | B1 | * | 8/2002 | Kull et al. | 303/15 |
| 6,474,150 | B1 | * | 11/2002 | Berg et al. | 73/121 |
| 6,719,376 | B1 | * | 4/2004 | Klein et al. | 303/3 |
| 7,765,859 | B2 | * | 8/2010 | Connell et al. | 73/121 |
| 2006/0266256 | A1 | * | 11/2006 | Donnelly et al. | 105/61 |
| 2007/0142984 | A1 | * | 6/2007 | Plawecki et al. | 701/20 |

* cited by examiner

*Primary Examiner* — Michael J Zanelli
(74) *Attorney, Agent, or Firm* — GE Global Patent Operation; John A. Kramer (57) ABSTRACT

A verification system is provided for verifying the availability of a first level of a braking system in a powered system. The powered system travels along a route. The verification system includes a controller coupled to an engine and a braking system of the powered system. The controller is configured to predetermine one of an activation level of the engine and/or an activation level of the braking system at a plurality of incremental locations along the route. The controller is further configured to activate the first level of the braking system at an incremental location having a predetermined activation level of the braking system which is lower than the first level of the braking system. A method is also provided for verifying the availability of the first level of a braking system in a powered system.

10 Claims, 5 Drawing Sheets

SYSTEM AND METHOD FOR VERIFYING THE AVAILABILITY OF A LEVEL OF A BRAKING SYSTEM IN A POWERED SYSTEM

CROSS-REFERENCE TO RELATED APPLICATIONS

This application is a continuation of U.S. patent application Ser. No. 12/189,980, filed Aug. 12, 2008 now U.S. Pat. No. 8,078,376, which claims priority to U.S. Provisional Application Ser. No. 61/048,275 filed Apr. 28, 2008, both incorporated herein by reference.

BACKGROUND OF THE INVENTION

This invention relates to a powered system, such as a train, an off-highway vehicle, a transport vehicle, and an agriculture vehicle, and more particularly to braking systems in such vehicles or other powered systems. Some powered systems such as, but not limited to, off-highway vehicles, transport vehicles such as transport buses, agricultural vehicles, and rail vehicle systems or trains, are typically powered by one or more diesel power units, or diesel-fueled power generating units. With respect to rail vehicle systems, a diesel power unit is usually a part of at least one locomotive powered by at least one diesel internal combustion engine, with the locomotive(s) being part of a train that further includes a plurality of rail cars, such as freight cars. Usually more than one locomotive is provided, wherein a group of locomotives is commonly referred to as a locomotive "consist." Locomotives are complex systems with numerous subsystems, with each subsystem being interdependent on other subsystems.

Powered systems, such as a locomotive consist, for example, include various types of braking systems, such as a dynamic braking system, for example. Locomotive consists may operate in an automatic mode, in which a controller predetermines an activation level of an engine (e.g., engine notch) and/or a braking system at incremental locations along a route, for example. Additionally, locomotive consists may operate in a manual mode, in which a locomotive operator manually adjusts the activation level of the engine and/or the braking system at each incremental location. Regardless of whether the locomotive consist operates in the automatic or manual mode, the availability of an activation level of the braking system, and particularly, a required activation level of the braking system in completion of a mission, such as a high activation level, for example, is significant to the proper operation of the locomotive consist in completing a mission.

Heretofore, the availability of an activation level of a braking system has not been ascertainable until the braking system is actually needed for carrying out a braking operation, e.g., when a locomotive travels down a steep grade. However, if the necessary activation level is not available for some reason, such as a braking system malfunction, it may be too late to take remedial action. Thus, it would be advantageous to provide a system which verifies the availability of various activation levels of the braking system, including a high activation level of the braking system, which may be required during the proper operation of the powered system in an automatic or manual mode.

BRIEF DESCRIPTION OF THE INVENTION

One embodiment of the present invention provides a verification system for verifying the availability of a first level of a braking system in a powered system. The powered system travels along a route. The verification system includes a controller coupled to an engine and a braking system of the powered system. The controller is configured to predetermine one of an activation level of the engine and/or an activation level of the braking system at a plurality of incremental locations along the route. The controller is further configured to activate the first level of the braking system (e.g., the braking system level whose availability is being verified) at an incremental location having a predetermined activation level of the braking system which is lower than the first level of the braking system.

In another embodiment of the present invention, the controller is configured to activate the first level of the braking system at an incremental location having a predetermined activation level of the engine which is lower than the first level of the braking system.

Another embodiment of the present invention provides a method for verifying the availability of a first level of a braking system in a powered system. The powered system includes an engine and a braking system, and the powered system travels along a route. The method includes predetermining one of an activation level of the engine and/or an activation level of the braking system at a plurality of incremental locations along the route. The method further includes activating the first level of the braking system at a first location having a first predetermined activation level of the braking system, where the first predetermined activation level is lower than the first level. The method further includes determining a second location along the route having a second predetermined activation level of the braking system which is greater than the first predetermined activation level. The first location is positioned prior to the second location along the route. The method further includes verifying the first activation level of the braking system at the first location.

DETAILED DESCRIPTION

Though exemplary embodiments of the present invention are described with respect to rail vehicles, specifically trains and locomotives having diesel engines, exemplary embodiments of the invention are also applicable for other powered systems, such as but not limited to off-highway vehicles (OHV) and transport vehicles, such as transport buses, for example, each of which may use a diesel or other engine. Towards this end, when discussing a specified mission, this includes a task or requirement to be performed by the powered system. Therefore, with respect to railway, off-highway vehicle or transport vehicle applications this may refer to the movement of the system from a present location to a destination. An operating condition of the diesel-fueled power generating unit may include one or more of speed, load, fueling value, timing, etc. Off highway vehicles may involve a fleet of vehicles that have a same mission to move along earth, from location A to location B, where each OHV is linked in time to accomplish the mission.

Figure 1:
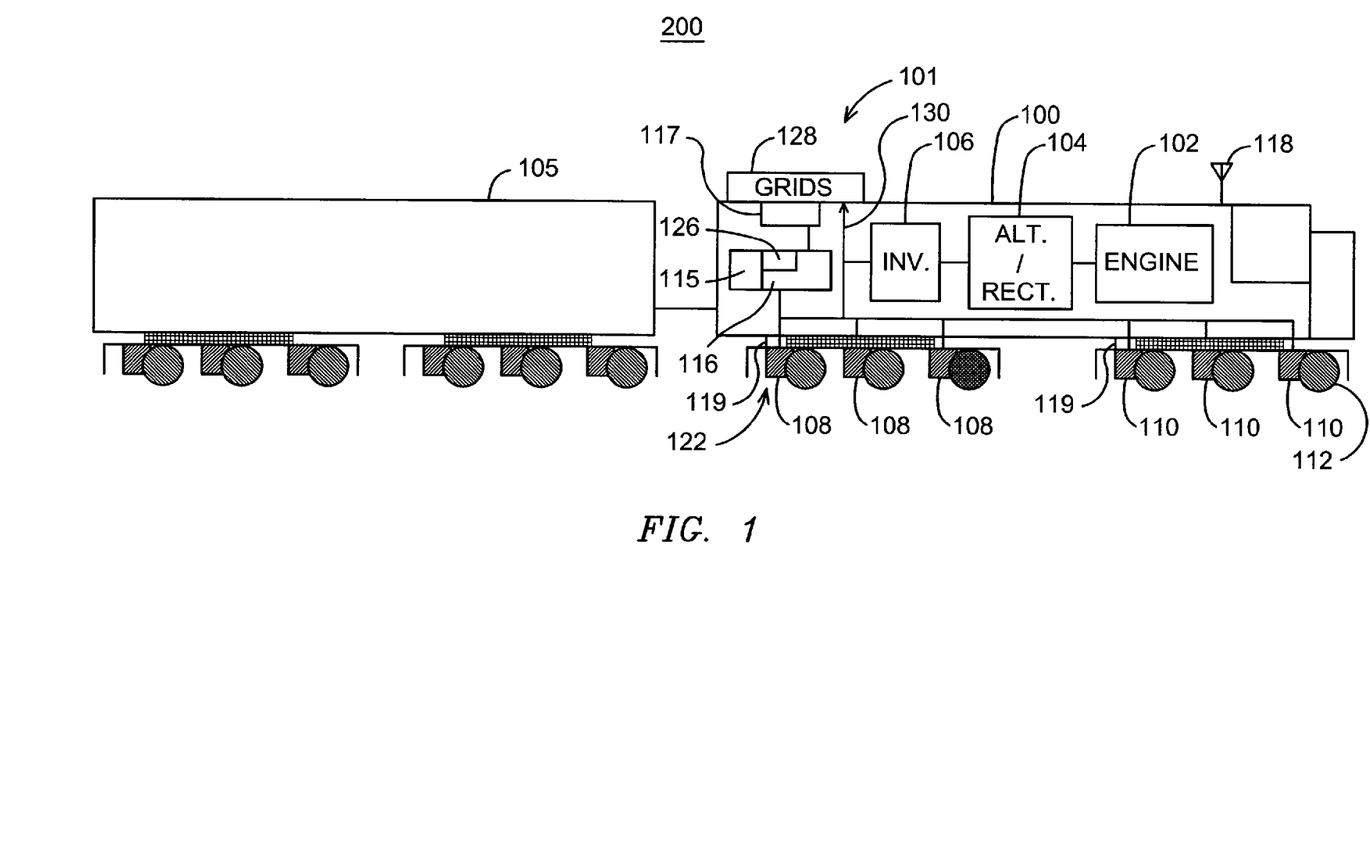
FIG. 1 is an exemplary embodiment of a system for monitoring the effectiveness of a braking function in a powered system in accordance with the present invention.

FIG. 1 illustrates an exemplary embodiment of a system 200 for monitoring the effectiveness of a braking function 122 in a powered system, such as a train 101, for example. As illustrated in the exemplary embodiment of FIG. 1, the train 101 includes a front locomotive 100 and a trailing car 105. The system 200 further includes a plurality of sensors 115, 117, 118, 119 to measure one or more parameters related to the operation of the train 101. As further illustrated in the exemplary embodiment of FIG. 1, the system 200 further includes a processor 116 which is coupled to the sensors 115, 117, 118, 119, in order to receive data of the measured parameters. Upon activating the braking function 122, the processor 116 is configured to determine the effectiveness of the braking function 122 of the train 101 based upon whether the parameter data varies by a predetermined threshold within a predetermined time or a predetermined distance, as discussed in further detail below.

The sensors 115, 117, 118, 119 may measure parameters related to the overall performance of the train 101, such as the speed, acceleration, or total tractive effort of the train 101, for example. As illustrated in the exemplary embodiment of FIG. 1, a speed sensor 115 is provided to measure the speed of the train 101, and to provide speed data to the processor 116. Upon receiving the speed data, the processor 116 may compute the time-derivative of this data, in order to obtain the acceleration data of the train 101. Alternatively, the system 200 may include an acceleration sensor which internally computes the train acceleration data and provides this acceleration data to the processor 116.

Figure 2:
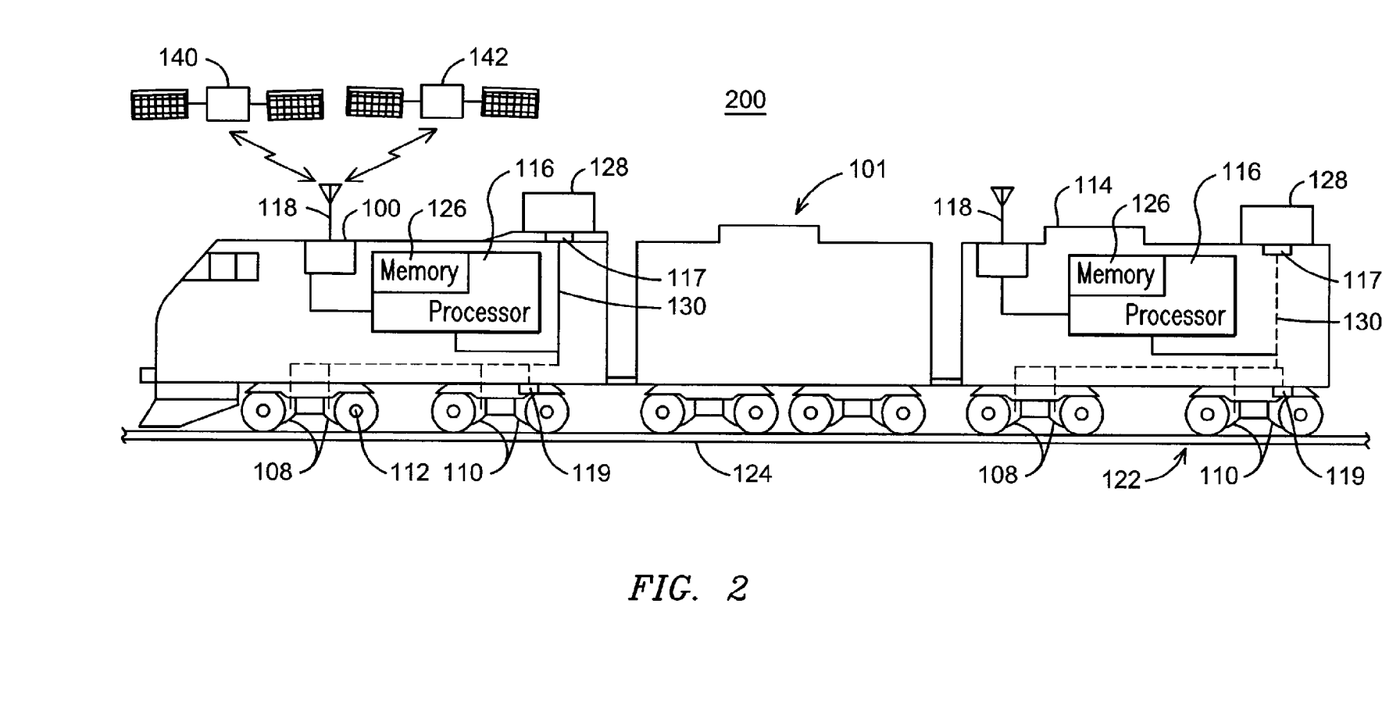
FIG. 2 is an exemplary embodiment of a system for monitoring the effectiveness of a braking function in a powered system in accordance with the present invention.

In an exemplary embodiment, upon activating the braking function 122, the processor 116 is configured to determine the effectiveness of the braking function 122 of the train 101 based upon whether parameter data related to the overall performance of the train 101 varies by a predetermined threshold within a fixed time or a fixed distance. The memory 126 of the processor 116 is configured to store the predetermined threshold to vary a first parameter during a fixed time or a fixed distance from a respective initial value at an initial time or an initial location. The predetermined threshold for variation of the first parameter over the fixed time or the fixed distance is based upon a plurality of secondary parameters at the initial time or initial location. In an example, as discussed above, upon activating the braking function 122, the processor 116 determines the acceleration data from the speed parameter data provided by the speed sensor 115 as the train 101 travels along a track 124 (FIG. 2). A predetermined threshold, such as a minimum deceleration, for example, is stored in the memory 126 of the processor 116 and is compared with the actual acceleration data. The minimum deceleration may be based on an initial value of one or more secondary parameters, such as an ambient temperature, the type of locomotive (AC or DC), physical characteristics of the locomotive, and a topography at the initial time or initial location of the train 101, for example. The processor 116 determines the effectiveness and/or the availability of the braking function 122 based upon whether the actual acceleration data complies with the minimum deceleration stored in the memory 126, for example.

In another example, upon activating the braking function 122, the processor 116 determines a total tractive effort produced by the traction motors 108, 110 based upon electrical current data measured by a sensor 119 such as a current meter positioned to measure a current passing through the traction motors 108,110 upon activation of the braking function 122. A predetermined threshold for the tractive effort, such as a minimum total tractive effort, may be stored in the memory 126 of the processor 116 and is retrieved to be compared with the actual tractive effort based upon the current data. The minimum total tractive effort may be based upon an initial value of one or more secondary parameters at the respective initial time or initial location, for example.

In another example, the sensor 118 may be a position determination device such as a transceiver, which is positioned on the external surface of the locomotive 100 and is configured to be in wireless communication with a plurality of satellites 140, 142 (FIG. 2) such as global positioning system (GPS) satellites, for example, to determine the location of the train 101. The position determination device, such as the transceiver, is coupled to the processor 116, and conveys the location information of the train 101 to the processor 116. A memory 126 of the processor 116 retrieves a track parameter, such as a track position or a topography, for example, of the current location of the train 101 from pre-stored data of the track parameter based on the location information provided by the position determination device. Additionally, the memory 126 of the processor 116 may store a predetermined threshold for varying the current location of the train 101 over the fixed time, which is then compared with the current location information of the train 101.

The sensors 115, 117, 118, 119 may also measure parameters related to the operation of individual components of the train 101, such as a plurality of resistive grids 128 used to dissipate electrical energy passed from the traction motors 108, 110 along a DC traction bus 130 during the braking function 122. In an exemplary embodiment, the sensors which measure parameters related to individual components of the train 101 may measure those parameters which relate to the generation of electrical energy by the traction motors 108, 110 to a DC traction bus 130 and/or the dissipation of the electrical energy delivered from the DC traction bus 130 through the grids 128 during the braking function 122, such as a dynamic braking function, for example. As illustrated in the exemplary embodiment of FIG. 1, a sensor 117 such as a voltmeter, which is coupled to the grids 128 to measure the voltage difference across the grids 128, is also coupled to the processor 116 to communicate this voltage difference data to the processor 116. Additionally, the sensors 115, 117, 118, 119 may measure parameters related to the traction motors 108, 110 which generate electrical energy during the braking function, and transmit this electrical energy to the DC traction bus 130, for example. As illustrated in the exemplary embodiment of FIG. 1, a sensor 119 such as a current meter is coupled to the traction motors 110 and is configured to measure the current passing through the traction motors 110, and is coupled to the processor 116 to communicate this current data to the processor 116.

Upon activating the braking function, the processor 116 is configured to determine the effectiveness of the braking function 122 of the train 101 based upon whether parameter data related to an individual component of the train 101 utilized during the braking function 122 varies by a predetermined threshold within a momentary time period. In an exemplary embodiment, the momentary time period may be less than one second, and the processor 116 may be configured to activate the braking function 122 and evaluate the components discussed above on a random basis, such as for one momentary time period during one long time period. In one example, the processor 116 may be configured to activate the braking function 122 to evaluate the components discussed below for one momentary time period (e.g., less than one second) every thirty minutes, and is further configured to randomly evaluate each component. Such individual components include those discussed above, such as the traction motors 108, 110 which generate electrical energy during the braking function 122 and transmit the electrical energy to the DC traction bus 130, and the grids 128 which receive the electrical energy from the DC traction bus 130 during the braking function 122 and dissipate the electrical energy. However, the embodiments of the present invention are not limited to evaluating parameters in connection with those components discussed above, and may include any component involved in the braking function 122.

In one example, the sensor 117, such as the voltmeter, provides the voltage difference data across the grids 128 during the braking function 122 to the processor 116, as discussed above. Upon activating the braking function 122, the processor 116 is configured to determine the effectiveness of the braking function 122 based upon whether the voltage difference varies by a predetermined threshold within the momentary time period. The predetermined threshold variation of the voltage difference during the momentary time period may be based on an initial value of one or more secondary parameters of components of the train 101, for example.

In another example, the sensor 119, such as the current meter, provides current data passing through the traction motors 108, 110 to the processor 116 during the braking function 122, as discussed above. Upon activating the braking function 122, the processor 116 is configured to determine the effectiveness of the braking function 122 based upon whether the current data varies by a predetermined threshold within the momentary time period. The predetermined threshold variation for the current data during the momentary time period may be based on an initial value of one or more secondary parameters of the components of the train 101, for example.

In another example, a pair of power sensors may be positioned to electrically couple the traction motors 108, 110 to the DC traction bus 130 and the plurality of grids 128 to the DC traction bus 130. Upon activating the braking function 122, the power sensors are configured to measure the electrical power delivered from the traction motors 108, 110 to the DC traction bus 130 within the momentary time period and the power received by the grids 128 from the DC traction bus 130 within the momentary time period. The processor 116 is configured to determine the effectiveness of the braking function 122 based upon the delivered power and the received power, more specifically, whether the delivered power and the received power are greater than a predetermined power stored in the memory 126. The predetermined power may be based on an initial value of secondary parameters of the components of the train 101 prior to initiation of the braking function 122.

FIG. 2 illustrates an additional embodiment of the present invention, including a train 101 having two locomotives 100, 114, where each locomotive 100, 114 has a plurality of traction motors 108, 110 coupled to a respective plurality of wheels 112 of the locomotives 100, 114. The train operator switches the train 101 into an idle mode, in which case the processor 116 of the first locomotive 100 is switched into a motoring mode such that an engine (and other related components) of the first locomotive 100 is responsible for transmitting electrical energy to the traction motors 108, 110 of the first locomotive 100. Also, upon switching the train 101 into the idle mode, the processor 116 of the second locomotive 114 is switched into a braking mode such that the traction motors 108, 110 of the second locomotive 114 transmit electrical energy to the DC traction bus 130 configured to electrically couple the traction motors 108, 110 and the plurality of grids 128 on the second locomotive 114. A pair of sensors 117, 119 is positioned to respectively couple the second locomotive traction motors 108, 110 to the DC traction bus 130 and the plurality of grids 128 to the DC traction bus 130. Upon switching the second locomotive 114 into the braking mode, the sensors 117, 119 are configured to respectively measure the electrical power delivered from the second locomotive traction motors 108, 110 to the DC traction bus 130 and the electrical power received by the grids 128 from the DC traction bus 130. The processor 116 is configured to determine the effectiveness of the braking function 122 based upon the delivered electrical power and the received electrical power.

FIG. 1 illustrates an exemplary embodiment of the present invention, including the locomotive 100 having a plurality of first traction motors 108 and second traction motors 110 coupled to a respective plurality of wheels 112 of the locomotive 100. The train 101 operator switches the train 101 into an idle mode, upon which the processor 116 is configured to switch a first traction motor 108 of the locomotive 100 into a motoring mode such that an engine 102 (and related components) of the locomotive 100 transmit electrical energy to the first traction motor 108. Additionally, the processor 116 is configured to switch a second traction motor 110 of the locomotive 100 into the braking function 122, such as a braking mode, for example, such that the second traction motor 110 transmits electrical energy to, the DC traction bus 130 which electrically couples the traction motors 108, 110 and a plurality of grids 128 on the locomotive 100. As discussed above, a respective pair of sensors may be positioned to respectively couple the second traction motor 110 to the DC traction bus 130 and the plurality of grids 128 to the DC traction bus 130. Upon switching the second traction motor 110 into the braking function 122, such as a braking mode, for example, the respective sensor is configured to measure the electrical power delivered from the second traction motor 110 to the DC traction bus 130 and the electrical power received by the grids 128 from the DC traction bus 130. The processor 116 is configured to determine the effectiveness of the braking function 122 based upon the delivered electrical power and the received electrical power.

Figure 3:
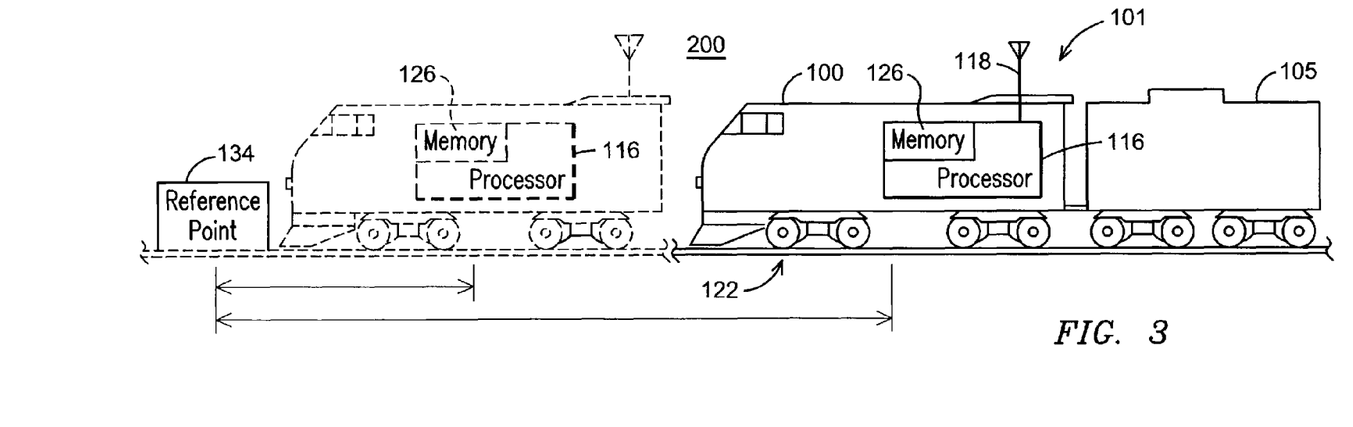
FIG. 3 is an exemplary embodiment of a system for monitoring the effectiveness of a braking function in a powered system in accordance with the present invention.

FIG. 3 illustrates an embodiment of a system 200 of the present invention. As discussed in the embodiments above, the train 101 includes a front locomotive 100 with a processor 116 and the processor 116 is configured to switch into a control enforcement mode to prevent the train 101 from traveling beyond a predetermined location 134 along the track 124. Upon switching into the control enforcement mode, the processor 116 is configured to monitor the effectiveness of the braking function 122, using one of the methods discussed above, as the train 101 approaches the predetermined location 134. The processor 116 is configured to initiate a remedial action upon determining that the effectiveness of the braking function 122 falls below a predetermined acceptable level. For example, the processor 116 may monitor the effectiveness of the braking function 122 by determining whether a parameter of the train 101 is varied by the predetermined threshold within a fixed distance prior to the predetermined location 134, such as whether the acceleration of the train 101 over that fixed distance complies with a minimum deceleration threshold over that fixed distance. The remedial action taken may be activating an alternate braking system, such as an air brake system, for example, activating an alarm to alert the train operator, and/or reconfiguring the braking system.

Figure 4:
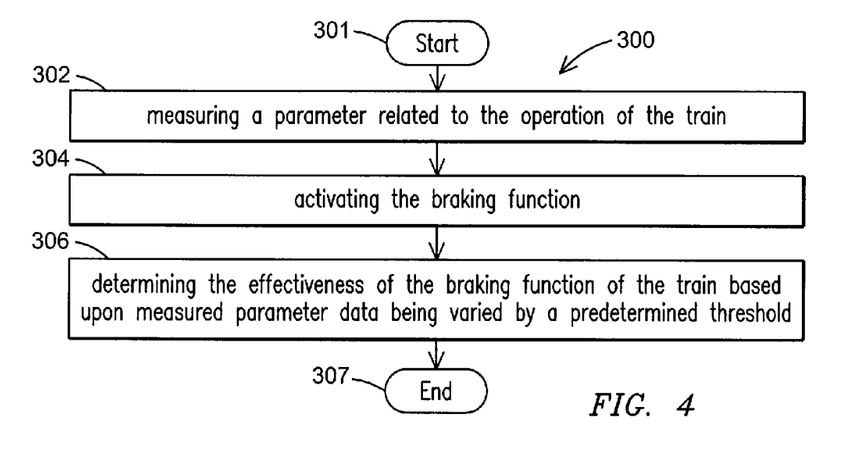
FIG. 4 is a flow chart illustrating an exemplary embodiment of a method for monitoring the effectiveness of braking function in a powered system in accordance with the present invention.

FIG. 4 is a flow chart illustrating an exemplary embodiment of a method 300 for monitoring the effectiveness of a braking function 122 in a powered system, such as a train, for example. The method 300 begins at 301 by measuring 302 a parameter related to the operation of the train 101. Additionally, the method 300 includes activating 304 the braking function 122, followed by determining 306 the effectiveness of the braking function 122 of the train 101 based upon the measured parameter data being varied by a predetermined threshold.

Based on the foregoing specification, the above-discussed embodiments of the invention may be implemented using computer programming or engineering techniques including computer software, firmware, hardware or any combination or subset thereof, wherein the technical effect is to monitor the effectiveness of a braking function in a powered system. Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system of the method embodiment of the invention. An apparatus for making, using or selling embodiments of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody those discussed embodiments the invention.

Figure 5:
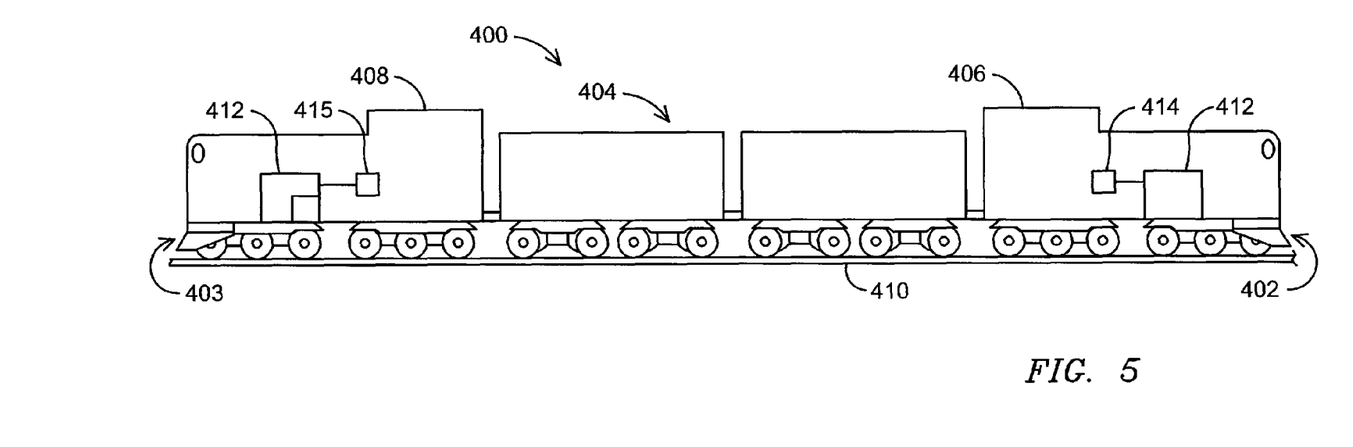
FIG. 5 is a block diagram of an exemplary embodiment of a system for verifying the availability of a high level of a braking system in a locomotive consist.

For those embodiments discussed in FIGS. 5-8, a motoring system of a locomotive will be referred to as an engine of the locomotive. FIG. 5 illustrates a system 400 for verifying the availability of a high level of a braking system 402 in a powered system, such as a locomotive consist 404, for example, including a lead locomotive 406 and a trail locomotive 408, for example. As discussed below and illustrated in FIGS. 5-8, a "high" level of a braking system typically refers to an approximate maximum operating level of the braking system. However, the system 400 may be utilized to verify levels of the braking system below the high level. Though exemplary embodiments of the present invention are described with respect to rail vehicles, specifically trains and locomotives having diesel engines, exemplary embodiments of the invention are also applicable for other powered systems, such as but not limited to off-highway vehicles (OHV) and transport vehicles, such as transport buses, for example, each of which may use a diesel or other engine. Towards this end, when discussing a specified mission, this includes a task or requirement to be performed by the powered system. Therefore, with respect to railway, off-highway vehicle or transport vehicle applications this may refer to the movement of the system from a present location to a destination. An operating condition of the diesel-fueled power generating unit may include one or more of speed, load, fueling value, timing, etc. Off-highway vehicles may involve a fleet of vehicles that have a same mission to move along earth, from location A to location B, where each OHV is linked in time to accomplish the mission.

Although the embodiments of FIGS. 5-8 discuss the system 400 as applied to a dynamic braking system, the system 400 may be applied to any type of braking system such as an air brake system, used in a powered system, such as a locomotive consist, for example. The locomotive consist 404 travels along a route, such as a railroad 410, for example. A controller 412 is coupled to a respective engine 414, 415 (i.e., motoring system) and the respective braking system 402, 403 of the lead locomotive 406 and the trail locomotive 408. The controller 412 switches between a motoring mode 450 (FIG. 6) to selectively activate a notch of the respective engine 414, 415, and a braking mode 452 (FIG. 6) to selectively activate a level of the respective braking system 402, 403. In an exemplary embodiment, the controller 412 may selectively activate the respective engine 414, 415 between a notch level between 0 and 8, for example. Additionally, in an exemplary embodiment, the controller 412 may selectively activate the respective braking system 402, 403 between a notch level of 0 and 8, for example.

Prior to commencing a trip along the railroad 410, the controller 412 predetermines an activation level 420 of the respective engine 414, 415 and/or an activation level 422 of the respective braking system 402, 403 at incremental locations along the railroad 410. In an exemplary embodiment, the controller 412 may predetermine the activation levels 420,422 at incrementally-spaced locations of varying separation along the railroad 410, as appreciated by one of ordinary skill in the art, based upon one or more particular trip parameters, including but not limited to: the total distance of the trip, a characteristic of the railroad 410 along the trip (e.g., grade), and a characteristic of the locomotive consist 404 (e.g., horsepower, weight, length, etc.), for example. Accordingly, the spacings of the incremental locations along the railroad 410 may vary from closely-spaced incremental locations (e.g., on the order of feet/yards) to distantly-spaced incremental locations (e.g., miles), based upon particular trip parameters. However, the spacings of the incremental locations along the railroad 410 may be fixed and set by the controller 412. Although the controller 412 may predetermine a high activation level (e.g., notch 8) of the respective braking system 402, 403 at a particular location on the railroad 410, the high activation level of the respective braking system 402, 403 may not be available once that location is reached. Examples of possible reasons for the lack of availability of the high activation level of the respective braking system 402, 403 may be that the traction motors of the braking system 402, 403 cannot produce sufficient current, a number of axles of the locomotive may have failed, the traction motors of the locomotive may have failed completely, and/or a miscalculation of the braking horsepower may have taken place (e.g., 5600 HP instead of 5200 HP). Thus, it would be advantageous to verify the high activation level of the respective braking system 402, 403, particularly at a location at which the high activation level of the respective braking system 402, 403 is not necessary. Accordingly, the system 400 is configured to verify the high activation level of the respective braking system 402,403 at a location where the predetermined activation level of the braking system 402,403 is lower than the high activation level. Additionally, the system 400 may be utilized to verify activation levels of the respective braking system 402,403 lower than the high activation level, provided that this verification takes place at a location where the predetermined activation level of the respective braking system 402,403 is lower than the activation level being verified. The process by which the controller 412 predetermines the activation level 420 of the respective engine 414,415 and/or the activation level 422 of the respective braking system 402,403 at the incremental locations along the route 410 is discussed in U.S. patent application Ser. No. 11/385,354/U.S. Patent Publication No. 2007/0219680A1, which is incorporated by reference herein in its entirety.

Figure 6:
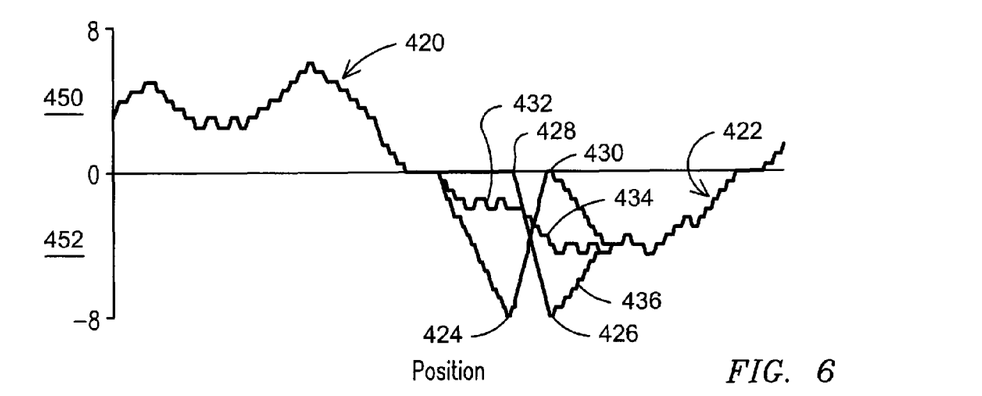
FIG. 6 is a plot of an exemplary embodiment of an activation level of an engine and a braking system to verify the availability of a high level of the braking system.

As illustrated in FIG. 6, when the locomotive consist 404 enters a region in which the controller 412 switches to the braking mode 452, and the predetermined activation level of the respective braking system 402, 403 is low, the controller 412 activates the high activation level 424 of the trail locomotive braking system 403 and simultaneously deactivates the lead locomotive braking system 402 at an incremental location 428. The controller 412 may simultaneously activate the high activation level 424 and deactivate the lead locomotive braking system 402 at the incremental location 428 having a predetermined low activation level 432. The high activation level 424 of the trail locomotive braking system 403 is then verified using one or more methods including: measuring a predetermined deceleration of the locomotive consist 404; measuring a predetermined tractive effort of the trail locomotive 408; or measuring an electrical property of one or more components of the trail locomotive 408, such as a predetermined current of the traction motors, and a voltage difference across the grids, for example.

Subsequent to the incremental location 428, the controller 412 activates the high activation level 426 of the lead locomotive braking system 402 and simultaneously deactivates the trail locomotive braking system 403 at an incremental location 430. Although FIG. 6 illustrates that the controller 412 simultaneously activates the high activation level 426 of the lead locomotive braking system 402 and deactivates the trail locomotive braking system 403, the activation of the high activation level 426 of the lead locomotive braking system 402 and deactivation of the trail locomotive braking system 403 does not need to be performed simultaneously. The controller 412 may simultaneously activate the high activation level 426 and deactivate the trail locomotive braking system 403 at the incremental location 430 having a predetermined low activation level 434. As with the high activation level 424 of the trail locomotive braking system 403 above, the high activation level 426 of the lead locomotive braking system 402 is verified using various methods discussed above. Although FIG. 6 illustrates that the controller 412 activates the high level of the trail or lead locomotive braking system 403, 402, while deactivating the respective lead or trail locomotive braking system 402, 403, the controller 412 may instead activate the high level of the trail or lead locomotive braking system 403, 402, while permitting the respective lead or trail locomotive braking system 402, 403 to remain at the predetermined activation level, for example.

As appreciated by one of skill in the art, the predetermined activation level of the engine 414, 415 and the braking system 402, 403 was respectively the same for the lead locomotive 406 and the trail locomotive 408. At the incremental locations 428, 430, the total of the predetermined low activation level 432, 434 for the braking systems 402, 403 is ideally the same as the total activation level upon activating the high activation level 424, 426 of the trail locomotive 408 and lead locomotive 406, respectively. For example, if the predetermined low activation level 432, 434 was notch 3, which would amount to a total activation level of 6, this would be in the vicinity of the total activation level (8) upon activating the high activation level 424, 426 of the trail locomotive 408 and lead locomotive 406. However, even if the total predetermined activation level of the braking systems 402, 403 at an incremental location does not equal the total activation level of the braking systems 402, 403 upon activating one of the high activation levels 424, 426, the controller 412 may activate one of the high activation levels 424, 426 for a sufficiently short period of time so that the overall impact on the velocity of the train performance is minimal. In one example, the activation of the high activation levels 424, 426 over the sufficiently short time period may be such that a disparity between a total braking level and a total predetermined braking level during the short time period reduce the speed of the locomotive consist by less than a speed threshold compared to a predetermined speed subsequent to the first incremental location.

However, subsequent to the incremental locations 428, 430, the controller 412 adjusts the activation level of the braking systems 402, 403 in an adjustment region 436, such that the speed of the locomotive consist 404 equates with the predetermined speed of the locomotive consist 404, based on the predetermined plan of the controller 412. Additionally, although FIG. 6 illustrates that upon activating the high activation level 424 of the trail locomotive braking system 403 at the incremental location 428, the controller 412 shortly thereafter deactivates the trail locomotive braking system 403 at the incremental location 430, the controller 412 may instead return the lead locomotive braking system 402 and the trail locomotive braking system 403 to the predetermined activation levels after the incremental location 428, for example.

Figure 7:
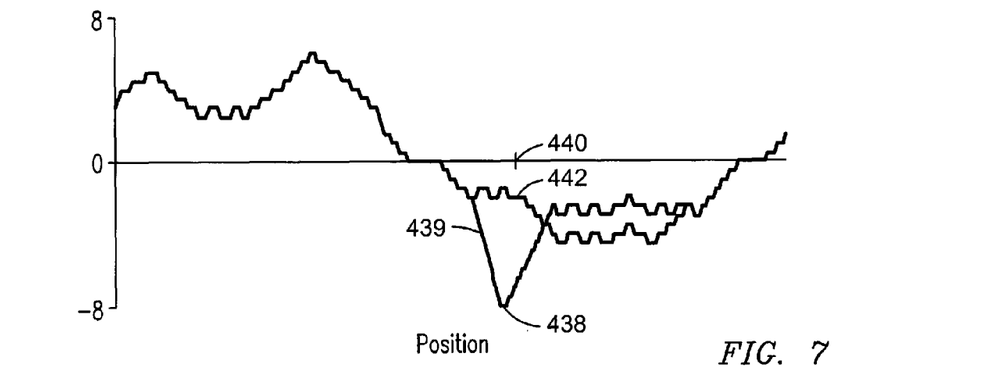
FIG. 7 is a plot of an exemplary embodiment of an activation level of an engine and a braking system to verify the availability of a high level of the braking system.

In another embodiment of the present invention illustrated in FIG. 7, the system 400 may be utilized for verifying the availability of a high level of a braking system 402 in a locomotive 406 traveling along the railroad 410. Similar to the embodiment discussed above in FIG. 6, the controller 412 activates a high level 438 of the braking system 402 at an incremental location 440 which had a predetermined low activation level 442 of the braking system 402. As with the braking system of the lead locomotive 406 and trail locomotive 408 discussed above, upon activating the high level 438 of the braking system 402, the high level 438 is verified using one of the several methods discussed above. As further illustrated in FIG. 7, the activation of the high level 438 of the braking system 402 is not abrupt, but is gradual enough so not to interfere with the handling of the locomotive 406. The gradual increase 439 in the level of the braking system 402 is enacted to ensure that no such interference takes place.

Figure 8:
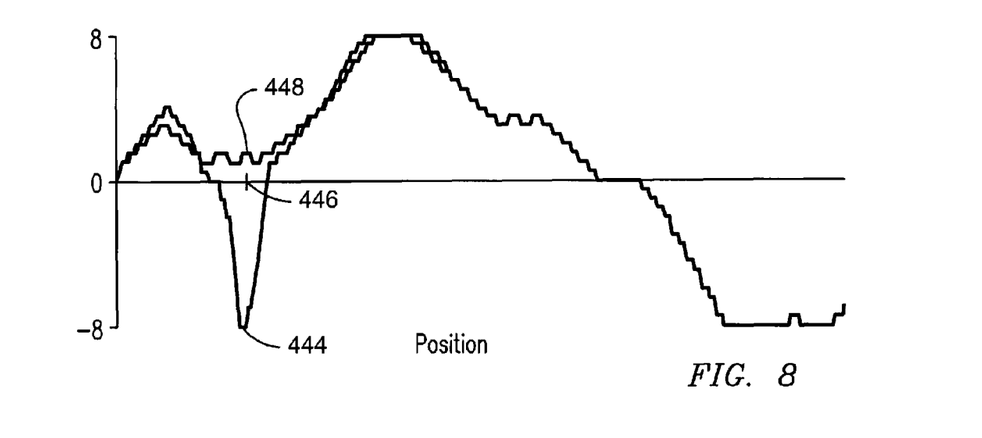
FIG. 8 is a plot of an exemplary embodiment of an activation level of an engine and a braking system to verify the availability of a high level of the braking system.

In an additional embodiment of the present invention illustrated in FIG. 8, the system 400 may be utilized in which the controller 412 activates the high level 444 of the braking system 402 at an incremental location 446 which had a predetermined low activation level 448 of the engine 414 in the motoring mode 450. As with the braking system of the locomotive 406 discussed above, upon activating the high level 444 of the braking system 402, the high level 444 is verified using one of the several methods discussed above. Typically, the high level 444 of the braking system 402 needs only to be verified at one location 446 on the trip prior to a region having a predetermined high activation level of the braking system 402. However, the controller 412 may verify the high level 444 of the braking system 402 on a periodic basis or a random basis, and need not exclusively verify the high level 444 on one occasion prior to a region having a predetermined high activation level of the braking system 402, for example. Additionally, instead of verifying the high level 444 of the braking system 402, the controller 412 may verify the braking system 402 to a maximum predetermined level of the braking system 402 during the predetermined plan, or to a predetermined amount exceeding the maximum predetermined level (e.g., 20%), as calculated by the controller 412, for example. Additionally, the controller 412 may be configured to verify a predetermined activation level of the braking system 402, as the controller 412 activates the braking system 402 to the predetermined activation level, for example. During the verification process of the braking system 402, if a lack of availability and/or failure of the braking system 402 at a high level or a low level is determined, the controller 412 may be configured to re-verify the high level 444 of the braking system 402 using the methods discussed above.

The system 400 as described in FIGS. 5-8 may be enacted by the controller 412 initially assessing the predetermined motoring/braking plan, and determining what locations a high level of the braking system is required. The controller 412 will then analyze the plan to determine a location having a low predetermined level of the braking system, in order to activate and verify the high level of the braking system at that location. In the event that the controller 412 is unable to determine such a location, the controller 412 will then determine a location having a low predetermined level of the engine (i.e., low motoring location), in order to activate and verify the high level of the braking system at that location. The location of low predetermined level of the braking system is generally preferred to activate and verify the high level of the braking system, since activating the high level of the braking system in a location having a low predetermined level of motoring will remove energy from the locomotive, and thus require replacement of this energy, amounting to a less efficient mode.

Figure 9:
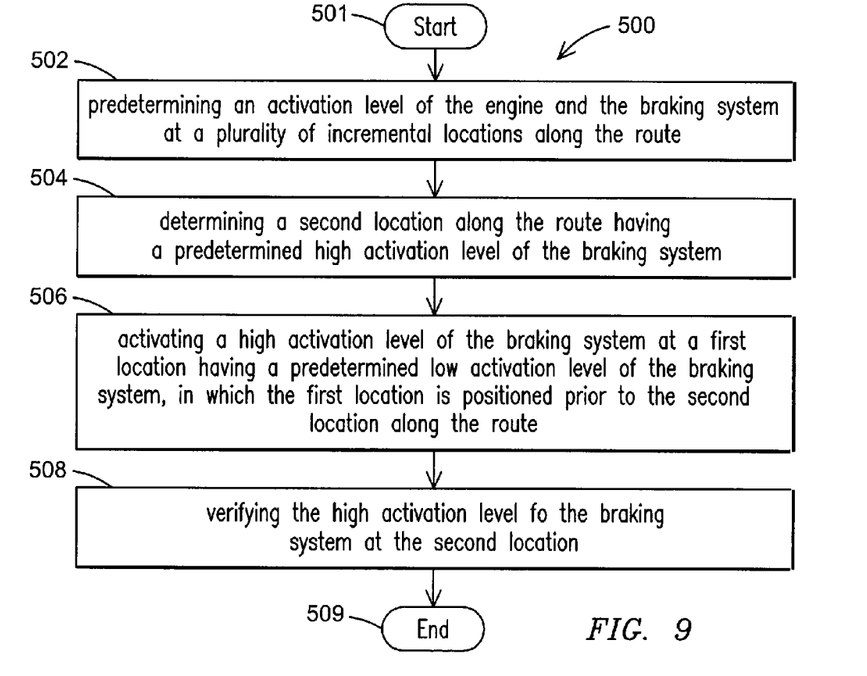
FIG. 9 is a flow chart of an exemplary embodiment of a method for verifying the availability of a high level of a braking system in a locomotive consist.

FIG. 9 illustrates an exemplary embodiment of a method 500 for verifying the availability of a high level of a braking system 402, 403 in a powered system such as a locomotive consist 404, for example. The powered system, such as the locomotive consist 404, includes an engine 414, 415 and the braking system 402, 403. The powered system, such as the locomotive consist 404 travels along a route, such as a railroad, for example. The method 500 begins at 501 by predetermining 502 one of an activation level of the engine 414, 415 and/or an activation level of the braking system 402, 403 at a plurality of incremental locations along the route. The method 500 further includes determining 504 a second location along the route having a predetermined high activation level of the braking system 402, 403. The method 500 further includes activating 506 a high activation level of the braking system 402, 403 at a first location having a predetermined low activation level of the braking system 402, 403. In an exemplary embodiment, the first location is positioned prior to the second location along the route, and the predetermined low activation level of the braking system 402,403 is lower than the high level of the braking system 402,403 which is to be activated and verified, for example. The first location is positioned prior to the second location along the route. Additionally, the method 500 includes verifying 508 the high level of the braking system 402, 403 at the first location, before ending at 509.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A verification method comprising:
predetermining a first activation level of an engine and/or a first activation level of a braking system of a vehicle at a first location along a route of the vehicle;
predetermining a second activation level of the engine and/or a second activation level of the braking system of the vehicle at a second location along the route, wherein the second location is positioned subsequent to the first location with respect to a direction of travel of the vehicle;
activating a first level of the braking system at the first location, wherein the first predetermined activation level is lower than the first level and the second predetermined activation level; and
verifying activation of the first level of the braking system at the first location.

2. The method of claim 1, wherein the step of verifying comprises sensing a parameter of the braking system during the activation of the first level of the braking system, and determining whether the parameter of the braking system varies by a predetermined threshold during the activation of the first level of the braking system.

3. The method of claim 1, wherein the step of verifying comprises measuring a predetermined deceleration of the vehicle.

4. The method of claim 1, wherein the step of verifying comprises measuring a predetermined tractive effort of the vehicle.

5. The method of claim 1, wherein the step of verifying comprises measuring an electrical property of one or more components of the vehicle.

6. The method of claim 1, wherein the steps of predetermining the first activation level and the second activation level are carried out prior to the vehicle commencing a trip along the route.

7. A verification method comprising:
identifying a region along a route of a rail vehicle consist having a first predetermined activation level of a braking system of the rail vehicle consist, wherein the first predetermined activation level is lower than a second predetermined activation level of the rail vehicle consist at a subsequent point along the route, the subsequent point being subsequent to the region in a direction of travel of the rail vehicle consist; and
when the rail vehicle consist is in the region:
activating a first level of the braking system in a first vehicle of the rail vehicle consist and deactivating the braking system in a second vehicle of the rail vehicle consist;
verifying activation of the first level of the braking system in the first vehicle;
deactivating the braking system in the first vehicle and activating a second level of the braking system in the second vehicle, wherein the first level and the second level are greater than the first predetermined activation level; and
verifying activation of the second level of the braking system in the second vehicle.

8. The method of claim 7, wherein the region is identified prior to the rail vehicle consist commencing a trip along the route.

9. A verification system comprising:
- a controller coupled to an engine and a braking system of a vehicle, wherein the controller is configured to predetermine one of an activation level of the engine and/or an activation level of the braking system at a plurality of incremental locations along a route of the vehicle, and said controller being configured to activate a first level of the braking system at an incremental location having a predetermined activation level of the braking system that is lower than the first level; and
- a sensor configured to measure one or more parameters related to operation of the vehicle during activation of the braking system;
- wherein the controller is configured to verify an availability of the first level of the braking system at the incremental location based on data of the measured one or more parameters received from the sensor.

10. The system of claim 9, wherein the controller is configured to predetermine the activation level of the braking system that is lower than the first level prior to the vehicle commencing travel along the route.

* * * * *